United States Patent Office 3,517,564
Patented June 30, 1970

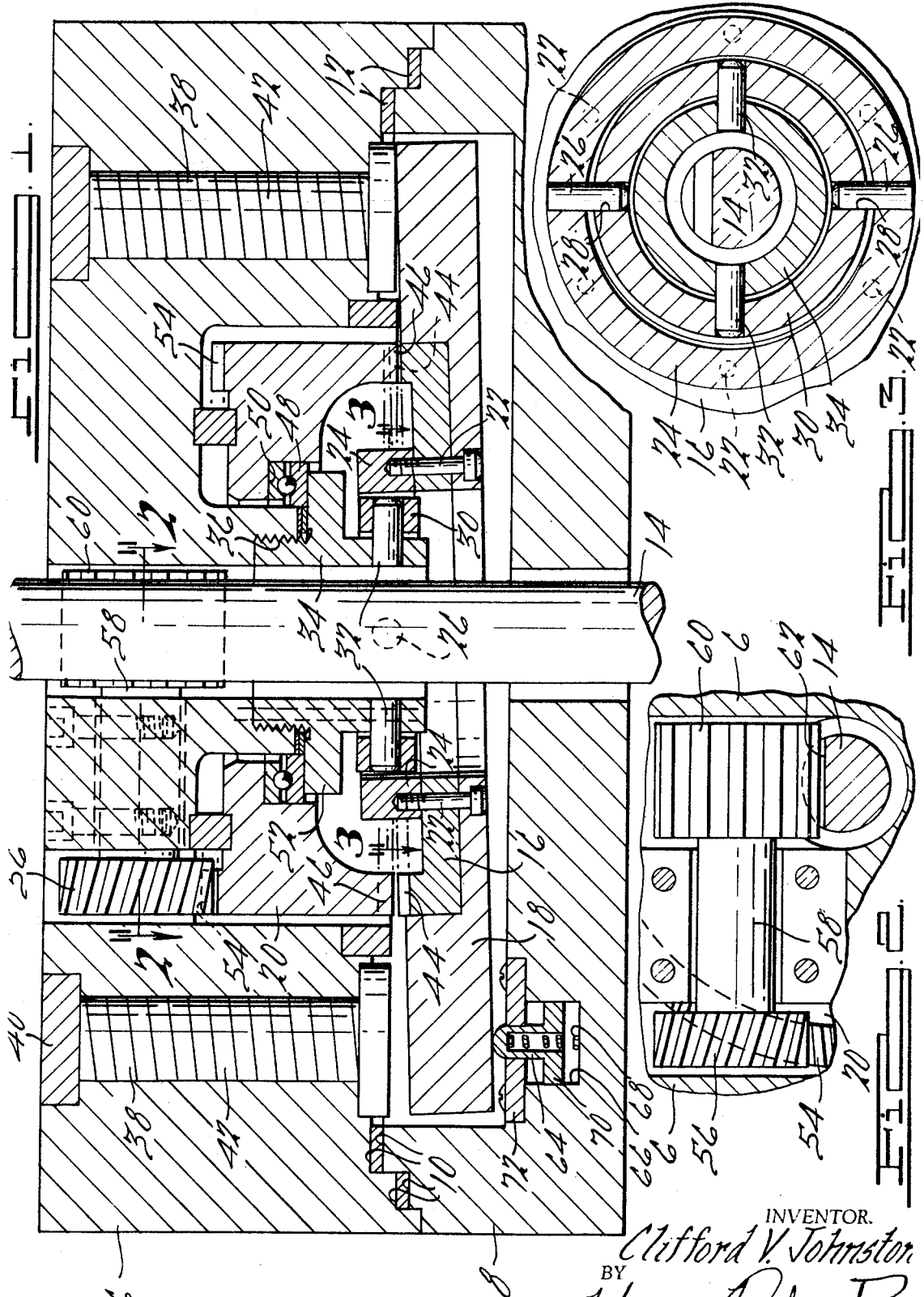

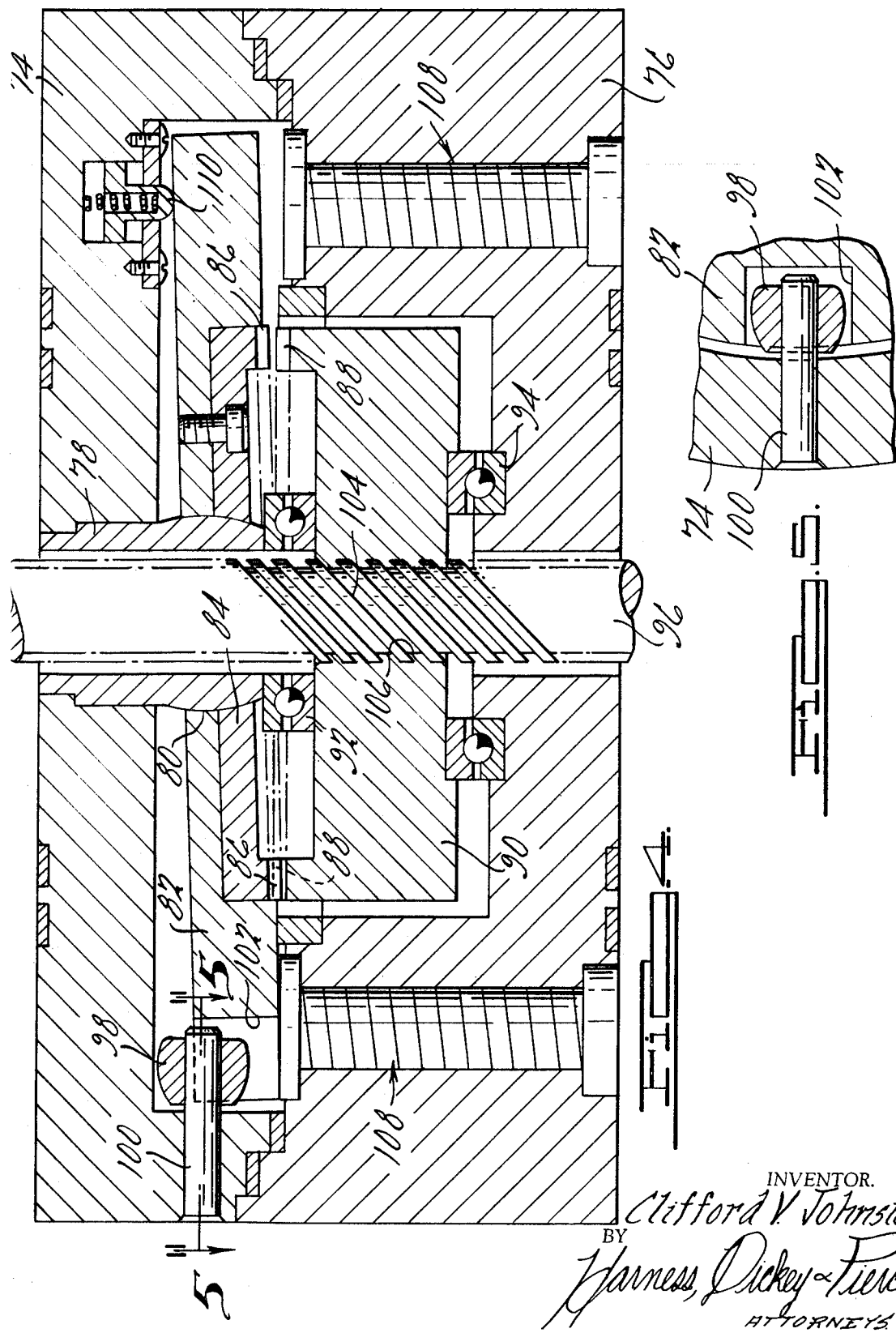

3,517,564
NUTATING DRIVE
Clifford V. Johnston, Harbor Hills, Hebron, Ohio, assignor to Diamond Power Specialty Corporation, a corporation of Ohio
Filed Mar. 14, 1968, Ser. No. 713,190
Int. Cl. F16h 25/12; H02k 7/06
U.S. Cl. 74—89.17
10 Claims

ABSTRACT OF THE DISCLOSURE

A nutating drive motor of compact size and high torque comprising a housing in which a first gear is rotatably mounted and is disposed in driving relationship with respect to a drive rod which extends through the housing and through the center portion of the first gear for imparting linear movement to the drive rod in response to rotation thereof. Rotation of the first gear is achieved by a nutating gear disposed substantially concentric to the first gear and is caused to undergo nutational motion by the progressive sequentially-timed energization of a plurality of circumferentially spaced electromagnets mounted in the housing.

BACKGROUND OF THE INVENTION

The present invention is particularly applicable, but not necessarily restricted, to a control rod drive assembly for nuclear reactors wherein the relative position of the control rod is operative to control the flux and heat generation of the reactor. There has been a continuing problem in control rod drive assemblies of the types heretofore known due to the relative complexity of the drive means employed for adjustably positioning the control rod, thereby detracting from the simplicity and reliability of the assembly, as well as the difficulty of achieving a durable seal between the drive member and the interior of the pressure vessel on which it is mounted. The present invention overcomes the aforementioned and other problems in providing a nutating drive motor which is of a simple and compact construction facilitating a manufacture, assembly and servicing thereof and, additionally, incorporates operating components of low inertia, avoiding the imposition of excessive forces on the drive assembly during a scramming of a control rod actuated thereby.

SUMMARY OF THE INVENTION

The foregoing and other advantages and benefits of the present invention are achieved by a nutating drive motor consisting of a housing within which a driven gear is rotatably mounted and a nutating gear is supported for nutating motion and is positioned substantially concentric to the driven gear and in meshing relationship therewith during the nutational motion thereof. A drive rod extends longitudinally through the housing and through the center portions of the driven gear and the nutating gear. The driven gear is drivingly connected to the drive rod for effecting a controlled linear movement thereof in response to rotation of the driven gear by the nutating gear. In accordance with one embodiment of the present invention, the connecting means comprise a rack formed on the drive rod disposed in constant meshing relationship with a pinion drivingly coupled to a second gear formed on the driven gear. In accordance with a second embodiment of the present invention, the linear movement of the drive rod is achieved by a helical gear formed on the periphery thereof disposed in threaded engagement with a conforming thread provided through the driven gear, effecting translatory movement of the drive rod in response to relative rotation between the driven gear and the rod.

Further benefits and advantages of the present invention will become apparent upon a reading of the description of the preferred embodiments taken in conjunction with the accompanying drawings.

BRIEF DESCRIPTION OF THE DRAWING

FIG. 1 is a transverse sectional view through a nutating drive motor constructed in accordance with a first embodiment of the present invention;

FIG. 2 is a fragmentary horizontal sectional view through the rack and pinion drive mechanism of the nutating drive motor shown in FIG. 1 and taken substantially along the line 2—2 thereof;

FIG. 3 is a horizontal fragmentary sectional view through the gimbal supporting mechanism for the nutating gear of the drive motor shown in FIG. 1 and taken substantially along the line 3—3 thereof;

FIG. 4 is a transverse vertical sectional view through a nutating drive motor constructed in accordance with an alternative embodiment of the present invention, and FIG. 5 is a fragmentary horizontal sectional view of the roller stop for retaining the nutating gear stationary relative to the driven gear shown in FIG. 4 and as viewed substantially along the line 5—5 thereof.

DESCRIPTION OF THE PREFERRED EMBODIMENTS

Referring now in detail to the drawings and in accordance with the first embodiment of the invention as illustrated in FIGS. 1–3, the nutating drive assembly comprises a two-piece housing consisting of an upper housing 6 and a lower housing 8, which are formed with conforming stepped flanges 10, between the mating faces of which gaskets 12 are disposed. A drive rod 14 extends through the upper and lower housing sections and is adapted to be connected such as, for example, to a control rod (not shown) of a nuclear reactor for the purposes as hereinbefore mentioned. The drive rod 14 extends through an enlarged aperture in the center portion of a nutating gear 16 mounted on an armature 18 and a driven gear 20 rotatably mounted in the upper housing 6.

As is best seen in FIGS. 1 and 3, the nutating gear 16 and the armature 18 are secured to each other by a series of circumferentially spaced screws 22, the threaded shank portions of which are disposed in threaded engagement in an outer ring 24 of a gimbal or universal-type joint. The outer ring 24, as best seen in FIG. 3, is pivotable about pins 26, which are disposed in diametrically opposed relationship and are rotationally supported in apertures 28 formed in an inner ring 30, which similarly is pivotable about diametrically disposed pins 32 oriented with their axes disposed at 90° to the axes of the pins 26. The inner ends of the pins 32 are affixed to a flanged tubular sleeve 34 having its threaded upper portion, as shown in FIG. 1, disposed in threaded engagement within a threaded aperture 36 formed centrally of the upper housing 6. The pivoting of the inner ring 30 and outer ring 24 about the axes of the pins 32 and 26, respectively, enables the nutating gear 16 and armature 18 to undergo a nutating motion or a wobbling motion through an angularity as shown in solid lines in FIG. 1, while at the same time preventing axial rotation thereof.

The nutating motion is applied to the armature and nutating gear by means of a plurality of circumferentially spaced pole pieces 38, which are of a magnetizable material but of a low flux retentivity, which are secured in the upper housing section 6, as best seen in FIG. 1. An annular flux ring 40 overlies the outer ends of the pole pieces 38 providing a return path of the magnetic flux between the pole portions. An electromagnetic winding or coil 42 is disposed around each of the pole pieces 38 forming an electromagnetic assembly, which is sealed within the upper housing section 6. The electromagnetic windings 42 are adapted to be energized in a circumferential sequence such as, for example, by a suitable pulse generator of a type well known in the art, at a desired rate and in a desired direction, effecting thereby a progressive magnetic attraction of peripherally spaced sections of the armature positioned adjacent to the inner end portions of the electromagnets.

The rotationally fixed nutating motion of the nutating gear 16 is transferred into rotating movement of the driven gear 20 by means of the meshing relationship between gear teeth 44 formed around the upper peripheral surface of the nutating gear and gear teeth 46 formed around the lower peripheral surface of the driven gear as shown in FIG. 1. The difference in the number of gear teeth 44 and 46, including a difference of only one tooth, results in the very low speed high torque rotation of the driven gear 20 in response to the nutating motion of the nutating gear. To minimize friction, the driven gear 20 is rotatably supported on a ball bearing 48 disposed between an annular counterbore 50 and the upper surface of an annular flange 52 of the flanged tubular sleeve 34.

The rotary movement of the driven gear 20 is transmitted by gear teeth 54 formed around the upper peripheral surface thereof to a gear 56 disposed in constant meshing relationship therewith, which is affixed to a shaft 58 rotatably supported in the upper housing section 6, as best seen in FIGS. 1 and 2. A pinion gear 60 is affixed to the opposite end of a shaft 58 and is disposed in constant meshing relationship with a rack 62 formed and extending longitudinally along one side of the drive rod 14. It will be apparent from this arrangement that a controlled up and down linear movement of the drive rod can be achieved by controlling the speed and direction of nutation of the nutating gear 16 and armature 18.

In the utilization of the nutating drive motor as a drive for the control rod of a nuclear reactor, it is desirable that in the event of an electrical power failure, or upon the occurrence of other unusual conditions that the control rod and the drive rod connected thereto be able to move downwardly in response to gravitational forces into the reactor to avoid thereby an undesirable build up in nuclear flux density. The rapid return of a control rod is conventionally referred to as "scramming." It is also conventional in such installations to provide a suitable separate locking device (not shown) which also is electromagnetically actuated to retain the control rod and drive rod in a desired or set position during operation of the reactor. Here again, in the event of a power failure or the occurrence of unusual conditions, the separate locking device is de-energized, enabling a downward scramming of the control rod. It is desirable in such drive mechanisms that the mass and inertia of the movable components be as small as possible to reduce the time required for the downward movement of the control rod during scramming, as well as to minimize the braking forces required to stop the control rod upon attaining the fully lowered position.

During normal operation of the nutating drive assembly, several adjacent coils 42 are maintained energized when the drive rod 14 has attained the appropriate position whereby the armature 18 and nutating gear thereon are disposed in an angularly inclined stationary position such as shown in FIG. 1. In this stationary position, the gear teeth 44 on the nutating gear are engaged and intermeshed with the adjacent gear teeth 46 on the driven gear effecting an interlock therebetween and preventing inadvertent linear movement of the drive rod.

In accordance with the arrangement as illustrated in FIGS. 1–3, a power failure or de-energization of the electromagnetic windings or coils 42 of the nutating drive assembly effects a cessation of the electromagnetic attraction of a peripheral section of the armature 18, whereby it is moved to a substantially horizontal position, as viewed in FIG. 1, in which the gear teeth 44 therearound are disposed substantially parallel to the gear teeth 46 around the lower peripheral surface of the driven gear and in which position they are disposed out of meshing relationship throughout their entire peripheral extent. The nutating gear and armature are, accordingly, declutched from the remaining movable components of the nutating drive motor reducing the mass and inertia thereof during a scram operation.

The movement of the nutating gear and armature to a declutched position is achieved by a plurality of flanged buttons 64, which are disposed in circumferentially spaced intervals in the lower housing section 8 adjacent to the peripheral portion of the armature 18, as best seen in FIG. 1. Each button 64 is slidably disposed within a bind bore 66 and is resiliently biased downwardly thereof by a coil spring 68. In the fully projected position of the flanged buttons 64, the upper surface of the integrally formed flange 70 thereof contacts the lower surface of a cover plate 72 providing a positive stop. The length of the shank end of the flanged buttons projecting beyond the outer surface of the cover plate 72, when in the fully projected position, is adjusted so that a plurality of the buttons effect a horizontal positioning of the armature and nutating gear in the declutched position. During normal operation of the nutating drive motor in which sequentially-phased energization of the electromagnetic coils 42 occurs, the magnetic attraction between the pole pieces and the peripheral sections of the armature is sufficiently strong to overcome the outward biasing force of the flanged buttons which are compressed inwardly during the nutating motion of the armature to a position as illustrated in FIG. 1.

An alternative satisfactory embodiment of a concentric linear nutating drive motor is illustrated in FIGS. 4 and 5 of the drawings which comprises an upper housing section 74 and a lower housing section 76 which are adapted to be clamped together in sealing relationship. A tubular shaft 78 is rigidly secured within an aperture extending axially through the upper housing section 74 and is formed with a spherical surface 80, around which an armature 82 and nutating gear 84 are slidably supported for universal pivoting movement as required during the nutational motion thereof. The nutating gear 84 is formed with gear teeth 86 around the lower peripheral surface thereof which are adapted to be disposed in meshing engagement with gear teeth 88 formed around the upper peripheral surface of a driven gear 90 rotatably supported between ball bearings 92, 94 for rotation about an axis concentric to the longitudinal axis of a drive rod 96.

The armature 82 and nutating gear 84 affixed thereto are restrained from rotation relative to the housing by means of a stop roller 98, as shown in FIGS. 4 and 5, rotatably supported on a pin 100 affixed to the upper housing section 74. The periphery of the stop roller 98 is adapted to be disposed within a peripheral slot 102 formed in the armature 82 for engaging the side surfaces thereof and restricting rotation of the armature relative to the housing.

The periphery of the drive rod 96 is formed with a helical thread 104, which may comprise an acme configuration with a pitch of approximately 45°, which is disposed in threaded engagement in conforming threads 106 formed in a bore extending axially through the center of the driven gear 90. In accordance with this arrangement, the nutation of the armature 82 and nutating gear 84 thereon by the electromagnet assemblies 108 in a manner previously described effecting an intermeshing of gear teeth 86 and 88, which are of a differential number, results in a controlled speed and direction of rotation of the driven gear 90, which in turn effects a corresponding linear up or down movement of the drive rod 96. A plurality of resiliently biased buttons 110 are disposed at circumferentially spaced intervals in the upper housing section 74 which are identical to the flanged buttons 64 previously described in connection with the embodiment illustrated in FIGS. 1–3. The buttons 110 similarly serve to position the armature and nutating gear in a horizontal position during the de-energization of the electromagnetic assemblies 108, effecting a declutching between the nutating gear and driven gear, enenabling gravitational downward movement of the drive rod 96 during scramming and a corresponding unrestricted rotation of the driven gear 90.

While it will be apparent that the invention disclosed herein is well calculated to fulfill the objects above stated, it will be appreciated that the invention is susceptible to modification, variation and change without departing from the proper scope or fair meaning of the subjoined claims.

What is claimed is:

1. A nutating drive motor comprising a housing, a first gear rotatably mounted in said housing, a nutating gear disposed substantially concentric to said first gear and disposed in meshing relationship therewith during nutational motion thereof, a drive rod extending through said housing and through the center portion of said first gear and said nutating gear, connecting means for drivingly connecting said first gear to said drive rod for effecting linear movement of said rod relative to said housing in response to rotation of said first gear, and means for imparting nutational motion to said nutating gear for rotating said first gear.

2. The nutating drive motor as defined in claim 1, wherein said first gear and said nutating gear are disposed substantially concentric to the longitudinal axis of said rod.

3. The nutating drive motor as defined in claim 1, wherein said nutating gear is restrained against rotation relative to said housing.

4. The nutating drive motor as defined in claim 1, including means yieldably urging said nutating gear into a position substantially parallel to said second gear and out of meshing relationship therewith along the entire peripheral portion thereof.

5. The nutating drive motor as defined in claim 1, further including an armature affixed to said nutating gear for undergoing nutational motion therewith, and wherein said last-mentioned means include a plurality of circumferentially spaced pole portions disposed adjacent to said armature, and means for inducing a varying magnetic flux in said pole portion in a timed circumferential sequence to cause nutating motion by progressively attracting peripherally spaced portions of said armature.

6. The nutating drive motor as defined in claim 1, wherein said connecting means comprises a rack on said drive rod and a pinion gear disposed in meshing relationship with said rack and drivingly coupled to said first gear.

7. The nutating drive motor as defined in claim 1, wherein said connecting means comprises a rack formed along said drive rod and a pinion disposed in constant meshing relationship with said rack, said pinion affixed on a shaft rotatably supported in said housing, a second gear concentrically formed on said first gear, and a third gear affixed to said shaft and disposed in constant meshing relationship with said second gear.

8. The nutating drive motor as defined in claim 1, wherein said connecting means comprises helical threads on said drive rod disposed in threaded engagement with conforming threads formed in said first gear for effecting linear movement of said rod in response to rotation of said first gear relative to said rod.

9. The nutating drive motor as defined in claim 1, wherein said connecting means comprises a helical thread disposed at a pitch of about 45° around the periphery of said drive rod disposed in threaded engagement with a conforming thread formed in a bore extending axially through and concentric of the axis of rotation of said first gear for effecting linear movement of said rod in response to rotation of said first gear relative to said rod.

10. The nutating drive motor as defined in claim 4, wherein said means yieldably urging said nutating gear into a position parallel to said second gear comprises a plurality of resiliently biased members for engaging and positioning said nutating gear in said position.

References Cited
UNITED STATES PATENTS

| 2,953,944 | 9/1960 | Sundt | 310—82 |
| 3,356,874 | 12/1967 | Chiapparelli et al. | 310—80 |
| 3,359,810 | 12/1967 | Hansen | 74—60 |

FOREIGN PATENTS 1,097,563   1/1961   Germany.

FRED C. MATTERN, Jr., Primary Examiner

W. S. RATLIFF, Jr., Assistant Examiner

U.S. Cl. X.R.

310—80